L. L. STORY.
ACCOUNTING DEVICE.
APPLICATION FILED NOV. 24, 1916.
1,240,621.
Patented Sept. 18, 1917.
2 SHEETS—SHEET 1.
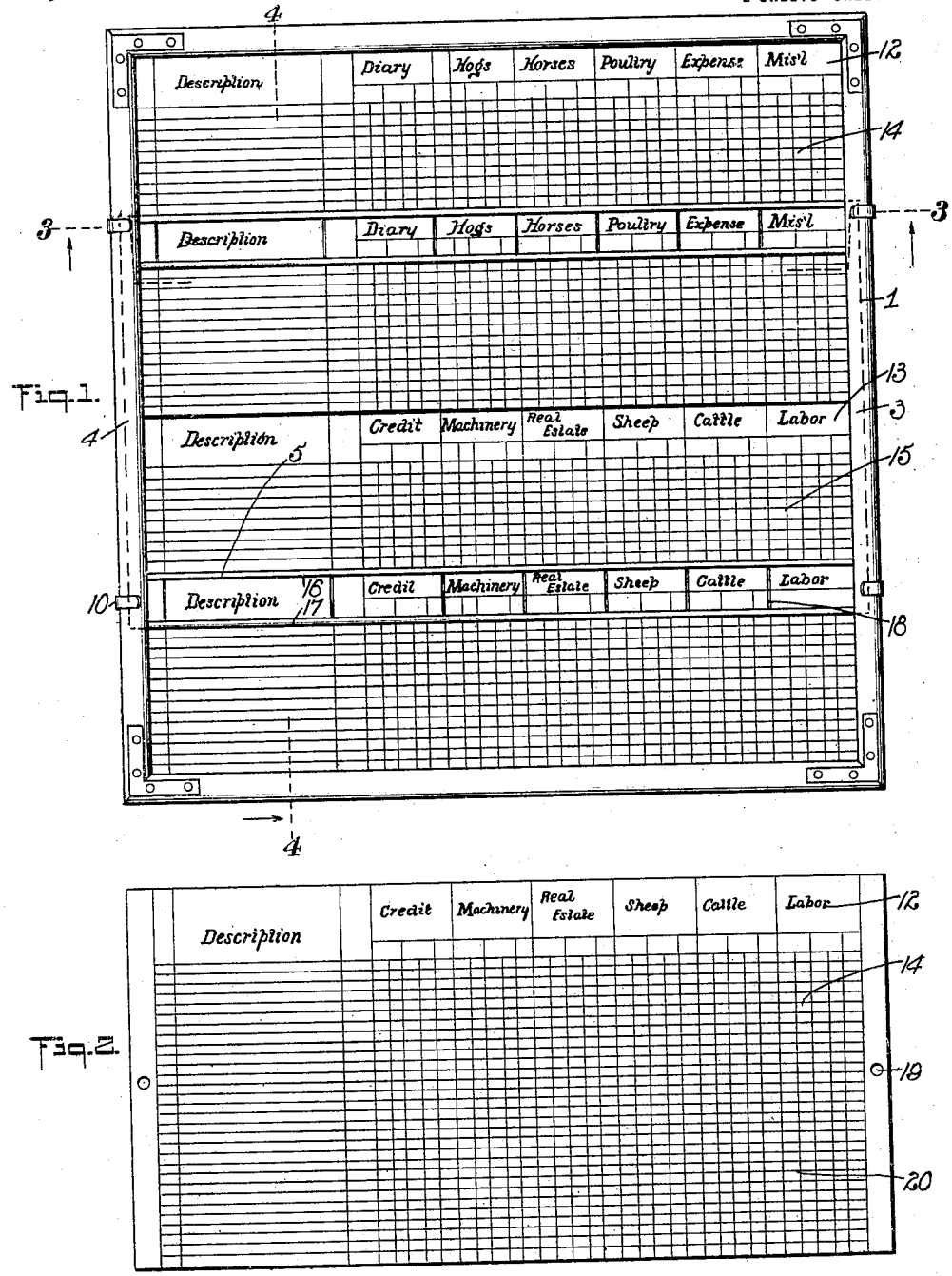

L. L. STORY.
ACCOUNTING DEVICE.
APPLICATION FILED NOV. 24, 1916.

1,240,621.

Patented Sept. 18, 1917.
2 SHEETS—SHEET 2.

WITNESSES

INVENTOR
L. L. Story
BY
ATTORNEYS

UNITED STATES PATENT OFFICE.

LEONARD LEACH STORY, OF EAST FAIRFIELD, VERMONT.

ACCOUNTING DEVICE.

1,240,621.      Specification of Letters Patent.      Patented Sept. 18, 1917.

Application filed November 24, 1916. Serial No. 133,137.

*To all whom it may concern:*

Be it known that I, LEONARD L. STORY, a citizen of the United States, and a resident of East Fairfield, county of Franklin, and State of Vermont, have invented a new and Improved Accounting Device, of which the following is a full, clear, and exact description.

This invention relates to accounting devices and has for an object the provision of an improved accounting member made up of a number of parts which will facilitate the correct entering of different items accurately.

Another object in view is to provide an accounting device with a base and frames for holding the accounting sheets in certain positions in order to readily receive the various items placed thereon.

A still further object in view is to provide an accounting device having accounting sheets together with a member carrying subject headings positioned to slide over the accounting sheets and thereby cause the headings to be always near the place where the items are to be entered.

A still further object of the invention is to provide an improved arrangement of parts in which a baseboard, a record sheet, a guiding member, and a straight edge and heading carrier are associated together, with suitable headings on the carrier for producing a complete simple device requiring a minimum effort to correctly enter any desired number of items.

In the accompanying drawings:

Figure 1 is a plan view of a complete accounting device embodying the invention.

Fig. 7 is an enlarged detail sectional view through one of the subject heading carriers.

Fig. 9 is a detail perspective view of a removing tool embodying certain features of the invention.

Fig. 10 is a section through Fig. 9 on line 10—10.

Figure 3:
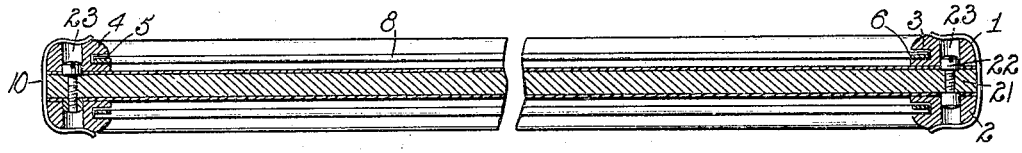
Fig. 3 is a section through Fig. 2 on line 3—3, the same being on an enlarged scale.
Figure 4:
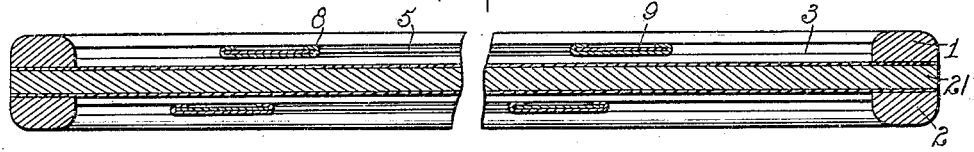
Fig. 4 is a section through Fig. 1 on line 4—4, the same being on an enlarged scale.
Figure 5:
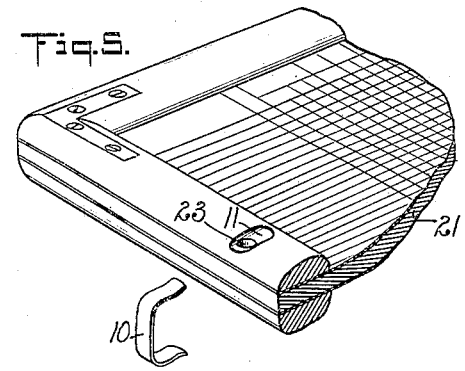
Fig. 5 is an enlarged detail perspective view of one corner of the device shown in Fig. 1.

Referring to the accompanying drawings by numerals, 1 and 2 indicate frames which may be made from wood or any other desired material and may have the parts connected together in any desired manner. It is also evident that the frames may be square, as shown in the drawings, or of other shape if desired provided the side members 3 and 4 of each frame are grooved for receiving the bars 5 and 6 of the carrier 7 as well as the ends of the sections 8 and 9. The frames 1 and 2 and parts associated therewith are of identical construction so that a description of one frame will apply equally to both, these frames being connected together by any suitable means, as for instance, clips 10 which are snapped over the frames in such a manner that the ends of the clips may fit into depressions 11.

Figure 2:
Fig. 2 is a plan view of one of the record sheets.
Figure 6:
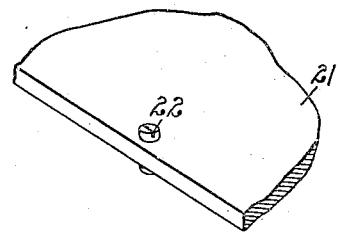
Fig. 6 is a detail fragmentary perspective view of the baseboard and retaining members.
Figure 8:
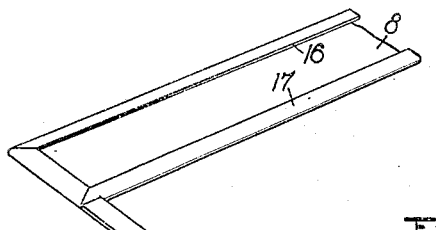
Fig. 8 is an enlarged detail perspective view of part of the subject heading carriers.

The carrier 7 may be provided with two or more sections 8 and 9 connected by the bars 5 and 6, said sections being spaced apart for any desired distance, preferably such a distance as to take up approximately half of the height of the frame 1 and thereby cover the heading spaces 12 and 13 on the sheets 14 and 15 when the carrier is moved to its highest or top position. Each of the sections 8 and 9 is provided with turnedover flanges 16 and 17 so as to provide guides for receiving the various cards 18 on which different information may be printed so as to provide headings for the record sheets 14 and 15. Not only are the cards 18 printed as shown in Fig. 1 and as just described, but they are also ruled to agree with the ruling on the sheets 14 and 15 so that a proper heading may be brought down to near where an entry is to be made and thereby assist in guiding the eye to the proper column when the entry is being placed on the particular sheet. As shown in Fig. 2 the sheets 14 and 15 are provided with apertures 19 and with ruling 20 of any kind together with the heading 12 or 13 as the case may be. As shown in the drawings, two record sheets 14 are arranged in the frame 1, but it is evident that the record sheet could be made sufficiently large so that one sheet would fill a frame, or three or more can be used without departing from the spirit of the invention.

Arranged between the frames 1 and 2 is a baseboard 21 of any suitable material, said baseboard having apertures meshing with apertures 19, and in these apertures pins or bolts 22 are positioned, part of the bolts, the heads and nuts thereof, extending beyond the baseboard 21 and into the apertures 23 in the frames 1 and 2, as shown in Fig. 3, so as to keep the frames properly alined as well as the baseboard 21 and the record sheets 14 and 15. By this construction and arrangement, when associated with the clips 10, means are provided for properly holding the two frames in position in connection with the baseboard 21 and also the record sheets.

It is evident that the cards or subject heading members 18 carrying the various heading matter may be taken out and new ones substituted at any time so that any desired heading may be used, whereby the device may be used in connection with any kind of articles. As shown in Figs. 9 and 10 a tool 24 is provided having a sharp end 25 to be inserted beneath the detachable subject heading members 18 when it is desired to remove the same. It is also evident that a large number of other ways could be provided for guiding the carrier 5 instead of the groove, but this particular means has proven to be very effective and simple in its construction. By the use of this groove the carrier may be readily moved back and forth while suspended a short distance above the record sheets and thereby prevent any smearing of the entries on the sheets.

What I claim is:

1. In a device of the character described, the combination of a baseboard, a record sheet on the baseboard, a frame for the baseboard provided with a guiding groove, a carrier slidably mounted in said groove, and subject heading members on said carrier.

2. In a device of the character described, the combination of a baseboard, a record sheet on the baseboard, a frame associated with the baseboard and acting to hold the record sheet in position thereon, a carrier formed with means coacting with the frame whereby the carrier is guided in a back and forth movement over the record sheet, and subject heading members arranged on said carrier.

3. In a device of the character described, the combination of a baseboard, a plurality of record sheets on said baseboard, a grooved frame, a carrier extending into said grooved frame formed with a plurality of retaining sections spaced apart so that one section may be utilized on one record sheet and the other sections on the other record sheets simultaneously, and subject heading members on each of the sections.

4. In an accounting device of the character described, a base, a frame on said base for clamping an article to the base, means for holding the frame and base together, and a heading carrier on said frame and guided thereby, said heading carrier being movable over said article and from one end of the frame to the other.

5. In an accounting device of the character described, a baseboard, a plurality of pins extending through the baseboard, a pair of frames having openings therein for receiving the ends of said pins whereby the baseboard and frames are held in a certain predetermined relationship, said frames being disposed on either face of the baseboard, securing members for securing said frames in position on said baseboard, and a sliding carrier on each of said frames whereby either side of the baseboard may be used for record sheets.

6. In an accounting device of the character described, a baseboard, a frame on said baseboard provided with a pair of grooves, a carrier slidingly mounted in said grooves, said carrier comprising a plurality of sections, a plurality of connecting bars, said connecting bars spacing the sections and acting as guides in said grooves, each of said sections comprising a bottom and turned-over edges presenting ways, and detachable subject heading members having their opposite edges projecting into said ways.

7. In an accounting device of the character described, means for receiving and holding in position a record sheet having a predetermined ruling and certain heading matter, a carrier formed with turnedover edges slidingly mounted on the record sheet so as to move thereover, and detachable subject heading members on said edges, said members having heading matter and rulings conforming to the rulings of the record sheet so that the carrier with the heading members thereon will be moved to near the place where an entry is to be made in order to guide the eye in making said entry.

8. In an accounting device of the character described, a baseboard provided with pins extending therethrough and projecting therebeyond on each side, a record sheet having apertures therein, said pins extending through said apertures, a frame on each side of said baseboard, said frames having apertures therein for accommodating the ends of said pins, a subject heading carrier slidingly mounted on each of said frames, and a removable spring clip straddling said frames for clamping the frames against the edges of the record sheets and for holding the parts together in proper relative position.

LEONARD LEACH STORY.

Copies of this patent may be obtained for five cents each, by addressing the "Commissioner of Patents, Washington, D. C."